United States Patent
Kimura et al.

(10) Patent No.: US 7,326,143 B2
(45) Date of Patent: Feb. 5, 2008

(54) ROTARY ACTUATOR

(75) Inventors: Kiyoshi Kimura, Oobu (JP); Taku Itoh, Aichi-ken (JP); Shigeru Yoshiyama, Kariya (JP)

(73) Assignee: Denso Corporation (JP)

( * ) Notice: Subject to any disclaimer, the term of this patent is extended or adjusted under 35 U.S.C. 154(b) by 60 days.

(21) Appl. No.: 11/086,306

(22) Filed: Mar. 23, 2005

(65) Prior Publication Data
US 2005/0215375 A1 Sep. 29, 2005

(30) Foreign Application Priority Data
Mar. 26, 2004 (JP) ............................. 2004-093157

(51) Int. Cl.
*F16H 1/32* (2006.01)
(52) U.S. Cl. ...................... 475/162; 475/149; 475/155; 475/178
(58) Field of Classification Search .............. 475/149, 475/153, 154, 155, 156, 157, 162, 168, 178, 475/179
See application file for complete search history.

(56) References Cited

U.S. PATENT DOCUMENTS

| 3,167,409 | A | * | 1/1965 | Brucken | 34/601 |
| 4,862,009 | A | * | 8/1989 | King | 290/22 |
| 5,683,323 | A | * | 11/1997 | Imase | 475/168 |
| 6,007,447 | A | * | 12/1999 | Lin | 475/149 |
| 6,176,801 | B1 | * | 1/2001 | Chen | 475/162 |
| 6,561,336 | B1 | * | 5/2003 | Huart et al. | 192/70.252 |
| 6,566,779 | B2 | * | 5/2003 | Takano et al. | 310/214 |
| 6,857,981 | B2 | * | 2/2005 | Hori et al. | 475/149 |
| 2004/0007935 | A1 | * | 1/2004 | Kimura et al. | 310/254 |
| 2004/0072646 | A1 | | 4/2004 | Hori et al. | |

FOREIGN PATENT DOCUMENTS

| JP | 2004-52928 | 2/2004 |
| JP | 2004-69021 | 3/2004 |

* cited by examiner

*Primary Examiner*—David D. Le
(74) *Attorney, Agent, or Firm*—Nixon & Vanderhye PC

(57) ABSTRACT

A radial inner portion of a rotor core, where a rotor core and a rotor shaft are connected, has an electromagnetically excessive capacity. A recess is provided at the radial inner portion of the rotor core. The recess is a cylindrical bore retracting in the axial direction from the front surface of the rotor core, facing to a reduction gear unit, toward the rear surface of the rotor core. A sun gear bearing, supporting a sun gear of the reduction gear unit, is disposed at least partly in the recess. Extending the sun gear bearing in the axial direction brings the effects of preventing inclination of the sun gear, improving transmission efficiency of the reduction gear unit, and producing a large output torque without increasing the overall size.

7 Claims, 12 Drawing Sheets

ROTARY ACTUATOR

CROSS-REFERENCE TO RELATED APPLICATION

This application is based upon and claims the benefit of priority from earlier Japanese Patent Application No. 2004-93157 filed on Mar. 26, 2004 so that the description of which is incorporated herein by reference.

BACKGROUND OF THE INVENTION

The present invention relates to a rotary actuator including a combination of a motor and a reduction gear unit, and more particularly to a rotary actuator including a motor and a reduction gear unit disposed adjacently in the axial direction to realize a compact and slim structure. The Japanese patent application Laid-open No. 2004-69021 discloses a conventional rotary actuator including a motor and a reduction gear unit disposed adjacently in the axial direction.

In general, improvement of output torque in the rotary actuator will be realized:
(1) when the motor size is enlarged;
(2) when the motor winding is enhanced (i.e. the ampere-turn is increased);
(3) when the permanent magnet, if required for the motor, is made of a material of a higher grade;
(4) when the motor core (stator core, and rotor core) is made of a material of a higher grade; and
(5) when a reduction gear ratio of the reduction gear unit is increased.

However, the above-described (1) to (5) cases will cause the following problems:
(1') the overall size of the rotary actuator will increase in accordance with increasing size of the motor;
(2') enhancing the motor wiring will increase electric power consumption and expand the motor size and the rotary actuator size;
(3'), (4') the motor costs will increase when the used materials are higher grades, and accordingly the cost of the rotary actuator will increase correspondingly; and
(5') increasing the reduction gear ratio will deteriorate the response of the rotary actuator and also enlarge the sizes of the reduction gear unit and the rotary actuator.

As described above, the conventional techniques for improving the output torque of the rotary actuator tend to cause various demerits.

Furthermore, if the output torque is increased, bearings in the rotary actuator loads will be subjected to larger loads. In other words, improvement of the bearing load capacity is required. This will result in expansion in the overall size of the rotary actuator. Especially, in the case that the rotary actuator is used for the shift-range switching apparatus of an automotive transmission, there is no sufficient space available for installing a large rotary actuator in an automotive vehicle. Thus, the rotary actuator must be compact or slim. Meanwhile, the rotary actuator is required to generate a large output torque. However, simultaneously satisfying a requirement of generating a higher output and a requirement of downsizing the rotary actuator was conventionally difficult.

SUMMARY OF THE INVENTION

In view of the above-described problems, the present invention has an object to provide a rotary actuator capable of generating a larger output without increasing the cost and the size.

In order to accomplish the above and other related objects, the present invention provides a rotary actuator including a combination of a motor and a reduction gear unit, wherein the motor has a rotor including a rotor core fixed on an outer cylindrical surface of a rotor shaft and a stator disposed at a radial outer side of the rotor core. The reduction gear unit, having the function of reducing a rotational speed of the rotor shaft, includes a sun gear disposed on the rotor shaft and disposed adjacently to the rotor core in an axial direction. Furthermore, according to the rotary actuator of the present invention, a recess is provided at a radial inner portion of the rotor core to provide an axially extending space opened toward the reduction gear unit. And, a supporting portion supporting a radial inner portion of the sun gear is disposed at least partly in this recess.

The radial inner portion of the rotor core, where the rotor core and the rotor shaft are connected, has an electromagnetically excessive capacity. As far as a sufficient connecting force is assured between the rotor core and the rotor shaft, it is possible to partly remove an excessive portion of the electromagnetically excessive capacity at the radial inner portion of the rotor core. According to the present invention, the recess is provided at the radial inner portion of the rotor core. The recess is a cylindrical bore retracting in the axial direction from the front surface of the rotor core, facing to the reduction gear unit, toward the rear surface of the rotor core. The recess provides a space for accommodating at least part of the supporting portion supporting the radial inner portion of the sun gear.

With this arrangement, it becomes possible to enlarge the axial size of the supporting portion of the sun gear and accordingly it becomes possible to prevent the sun gear from inclining or tilting. In general, if the sun gear inclines or tilts, there will be the possibility that the meshing accuracy between the gears will deteriorate. The torque transmission efficiency in the reduction gear unit will deteriorate and accordingly the output torque of the rotary actuator will deteriorate.

In this respect, the rotary actuator according to the present invention can provide a sufficiently long supporting portion of the sun gear axially extending into the recess formed at the radial inner portion of the rotor core. Hence, even if the sun gear is subjected to a large load, the sun gear does not incline or tilt. Thus, the reduction gear unit has excellent torque transmission efficiency. As a result, the rotary actuator can generate a large output torque. In short, the present invention can provide a rotary actuator capable of increasing an output torque without increasing the overall size thereof.

Furthermore, providing the recess as an axially extending bore in the rotor core for accommodating the axially elongated supporting portion of the sun gear ensures the above-described effects (i.e. obtaining a large output without increasing the overall size of the rotary actuator). Namely, the rotary actuator of the present invention obtains the above-described effects without increasing the cost of the motor core (i.e. the rotor core and the stator core), because it is unnecessary to use expensive materials for the cores and for the permanent magnet (if required).

Furthermore, the region (or portion) to be removed from the rotor core is limited within an excessive portion of the electromagnetic capacity. Thus, no adverse effects will be given to the motor characteristics. The output characteristics will not deteriorate, and electric power consumption will not increase.

Furthermore, the reduction gear unit needs not increase the reduction gear ratio and accordingly the response of the rotary actuator does not deteriorate. Furthermore, the overall size of the rotary actuator does not increase. Furthermore, providing the recess at the radial inner portion of the rotor core is advantageous in reducing the weight of the rotor core.

According to the rotary actuator of the present invention, it is preferable that the motor is a reluctance motor.

According to the rotary actuator of the present invention, it is preferable that the reduction gear unit is a planetary reduction gear unit.

In this case, it is preferable that the rotor shaft has an eccentric portion causing predetermined eccentric rotational motions. The sun gear is disposed via a sun gear bearing on an outer cylindrical surface of the eccentric portion of the rotor shaft to cause swing and rotational motions. The planetary reduction gear unit is an inner gearing planetary reduction gear unit including the sun gear, a ring gear meshing with the sun gear, and a transmitting mechanism transmitting rotation of the sun gear to an output shaft.

In this case, it is preferable that the sun gear bearing of the rotary actuator includes roller members disposed adjacently and parallel to each other in the axial direction so as to form a double-bearing arrangement, and the double-bearing arrangement is partly disposed in the recess.

According to the rotary actuator in accordance with the present invention, it is preferable that the rotary actuator is for driving a shift-range switching apparatus of an automotive automatic transmission.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

As a best mode of the present invention, the inventors of this patent application provide a rotary actuator which includes a motor and a reduction gear unit. The motor (e.g. a reluctance motor) has a rotor and a stator. The rotor includes a rotor core fixed on an outer cylindrical surface of a rotor shaft. The stator is disposed at a radial outer side of the rotor core. The reduction gear unit (e.g. a planetary reduction gear unit, an inner gearing planetary reduction gear unit, or the like), provided for reducing a rotational speed of the rotor shaft, includes a sun gear disposed on the rotor shaft and disposed adjacently to the rotor core in an axial direction. A recess is provided at a radial inner portion of the rotor core to provide an axially extending space opened toward the reduction gear unit. And, a supporting portion (e.g. a sun gear bearing, a double-bearing arrangement or the like) supporting a radial inner portion of the sun gear is disposed at least partly in the recess.

Preferred Embodiment

A rotary actuator in accordance with a preferred embodiment of the present invention will be explained with reference to FIGS. 1 to 14. The rotary actuator of this embodiment is for generating a driving force to control a shift-range switching apparatus of an automotive automatic transmission. First of all, the shift-range switching apparatus of the preferred embodiment will be explained.

Shift-Range Switching Apparatus

Figure 1:
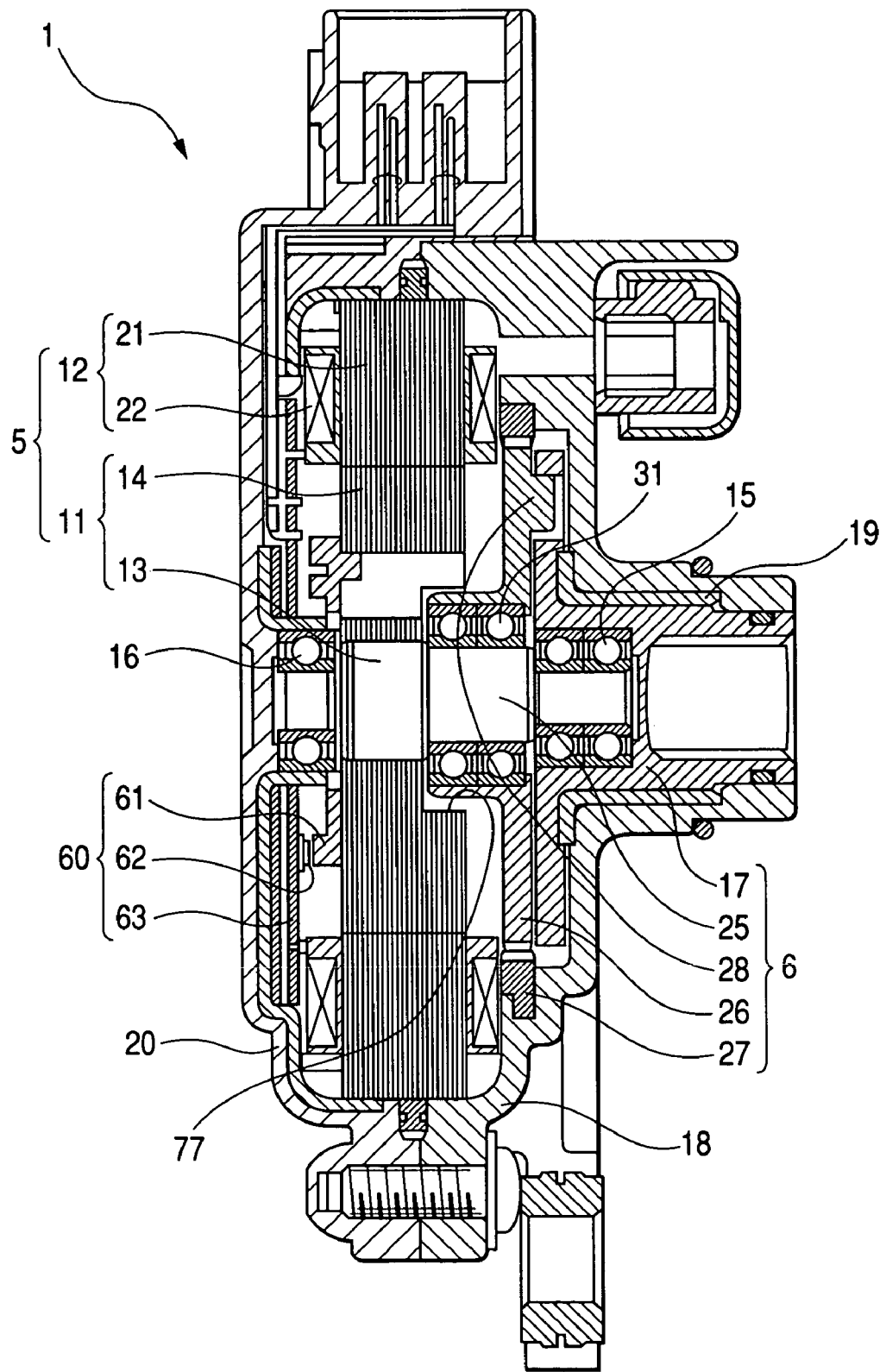
FIG. 1 is a cross-sectional view showing a rotary actuator in accordance with a preferred embodiment of the present invention.

The shift-range switching apparatus is for switching a shift-range switching mechanism 3 (including a parking lock/unlock mechanism 4: refer to FIG. 3) mounted on an automotive automatic transmission 2 (refer to FIG. 2) with the aid of a rotary actuator 1 (refer to FIG. 1). The rotary actuator 1, capable of acting as a servo mechanism for driving the shift-range switching mechanism 3, includes a synchronous motor 5 and a reduction gear unit 6. The rotary actuator 1 shown in FIG. 1 has a front part facing rightward and a rear part positioned at the left side.

Motor 5

The motor 5 will be explained with reference to FIGS. 1 and 4. The motor 5 of this embodiment is a brushless SR motor (i.e. switched-reluctance motor) using no permanent magnets. The motor 5 includes a rotor 11 rotating about its rotation center and a stator 12 disposed coaxially with the rotation center of the rotor 11. Essential portions of the motor 5 relating to the present invention will be explained later.

The rotor 11 consists of a rotor shaft 13 and a rotor core 14. The rotor shaft 13 has a front end portion rotatably supported by a roller bearing (i.e. a front roller bearing 15) and a rear end portion rotatably supported by a roller bearing (i.e. a rear roller bearing 16). The front roller bearing 15 is firmly fixed to an inner bore of an output shaft 17 of the reduction gear unit 6. The output shaft 17 of the reduction gear unit 6 is rotatably supported by a metal bearing 19 which is disposed on an inner cylindrical surface of a front housing 18. In other words, the front end of the rotor shaft 13 is rotatably supported via the front roller bearing 15, the output shaft 17, and the metal bearing 19 by the boss portion of the front housing 18.

The support section of the metal bearing 19 in the axial direction overlaps with a support section of the front roller bearing 15 in the axial direction. Employing such an overlap arrangement makes it possible to prevent the rotor shaft 13 from inclining due to a reaction force acting in the reduction gear unit 6 (more specifically, a reaction force of the load generating when a later-described sun gear 26 meshes with a ring gear 27). On the other hand, the rear roller bearing 16 is press-fitted around an outer cylindrical surface of the rear end of the rotor shaft 13. Furthermore, the rear roller bearing 16 is supported by a rear housing 20.

Figure 4:
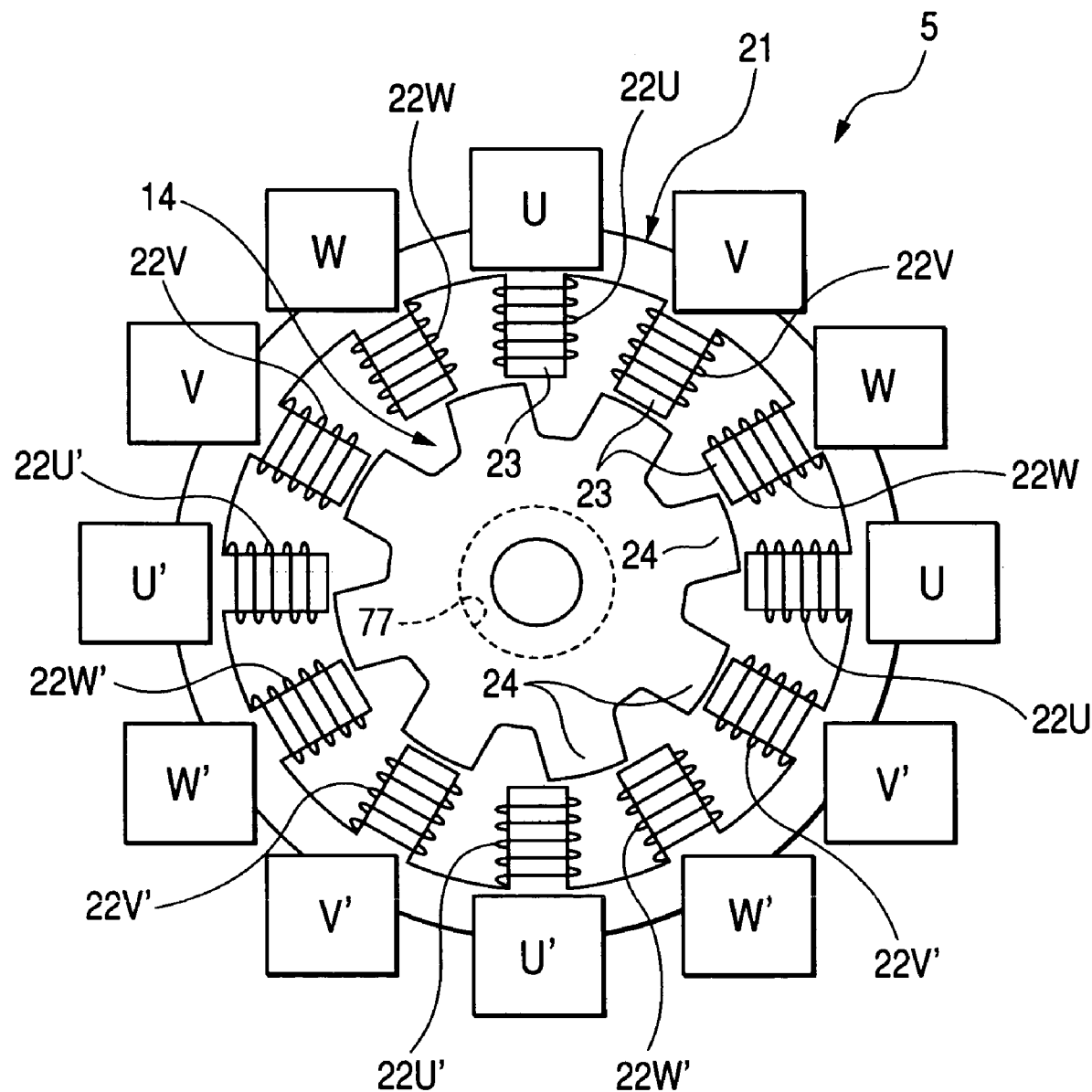
FIG. 4 is a front view showing a motor in accordance with the preferred embodiment of the present invention.
Figure 5:
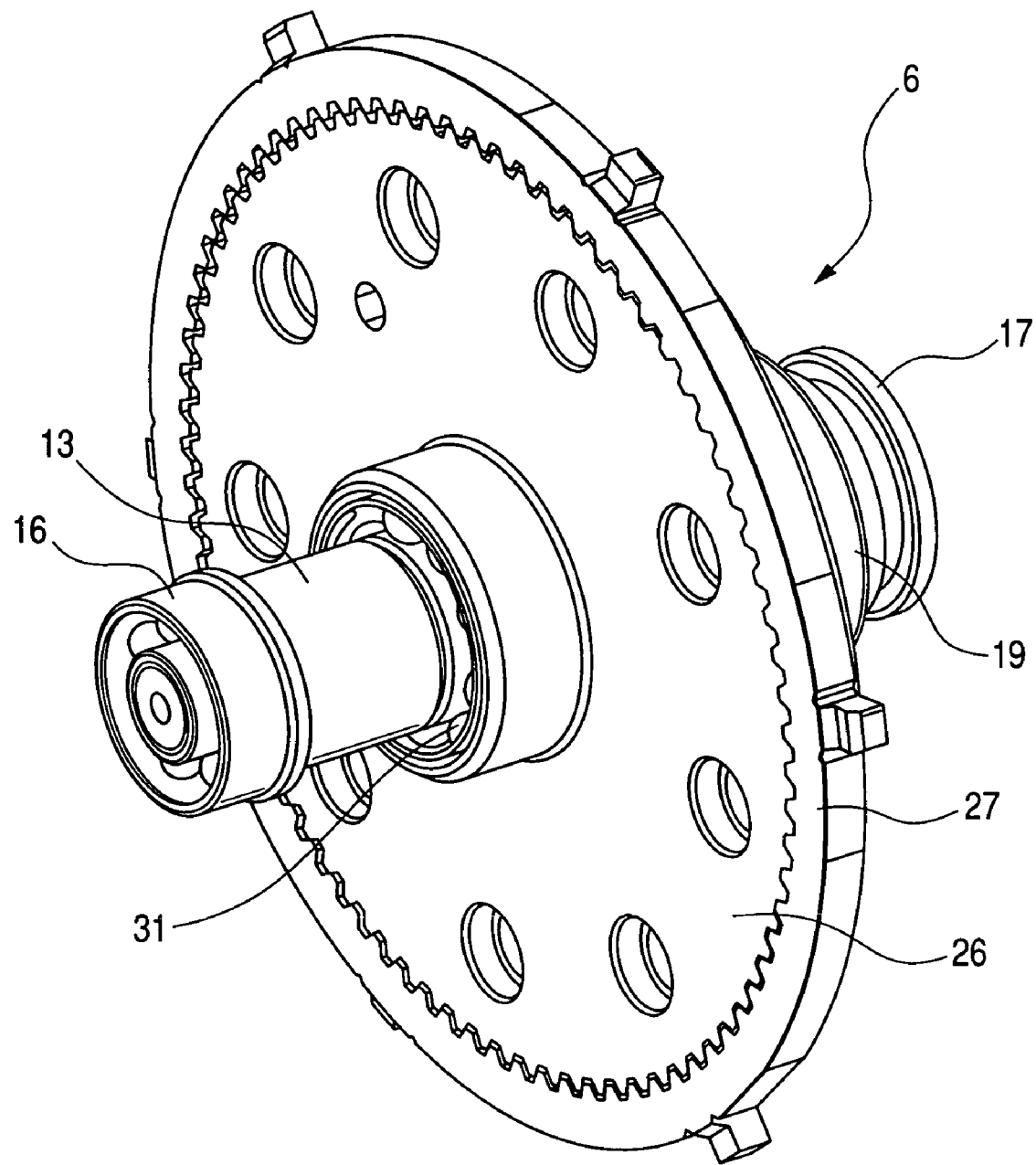
FIG. 5 is a perspective view showing a rear side of a reduction gear unit in accordance with the preferred embodiment of the present invention.
Figure 6:
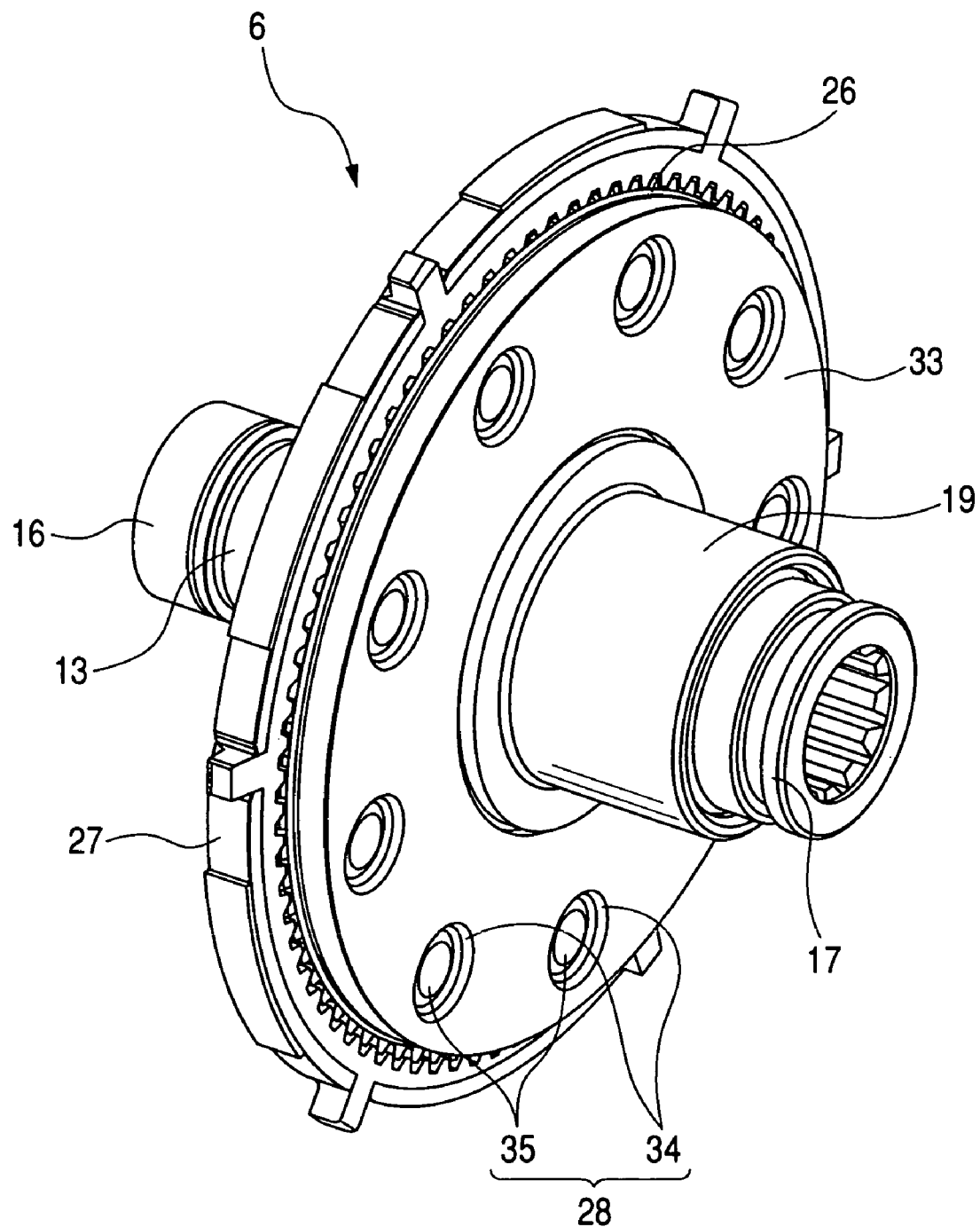
FIG. 6 is a perspective view showing a front side of the reduction gear unit in accordance with the preferred embodiment of the present invention.
Figure 7:
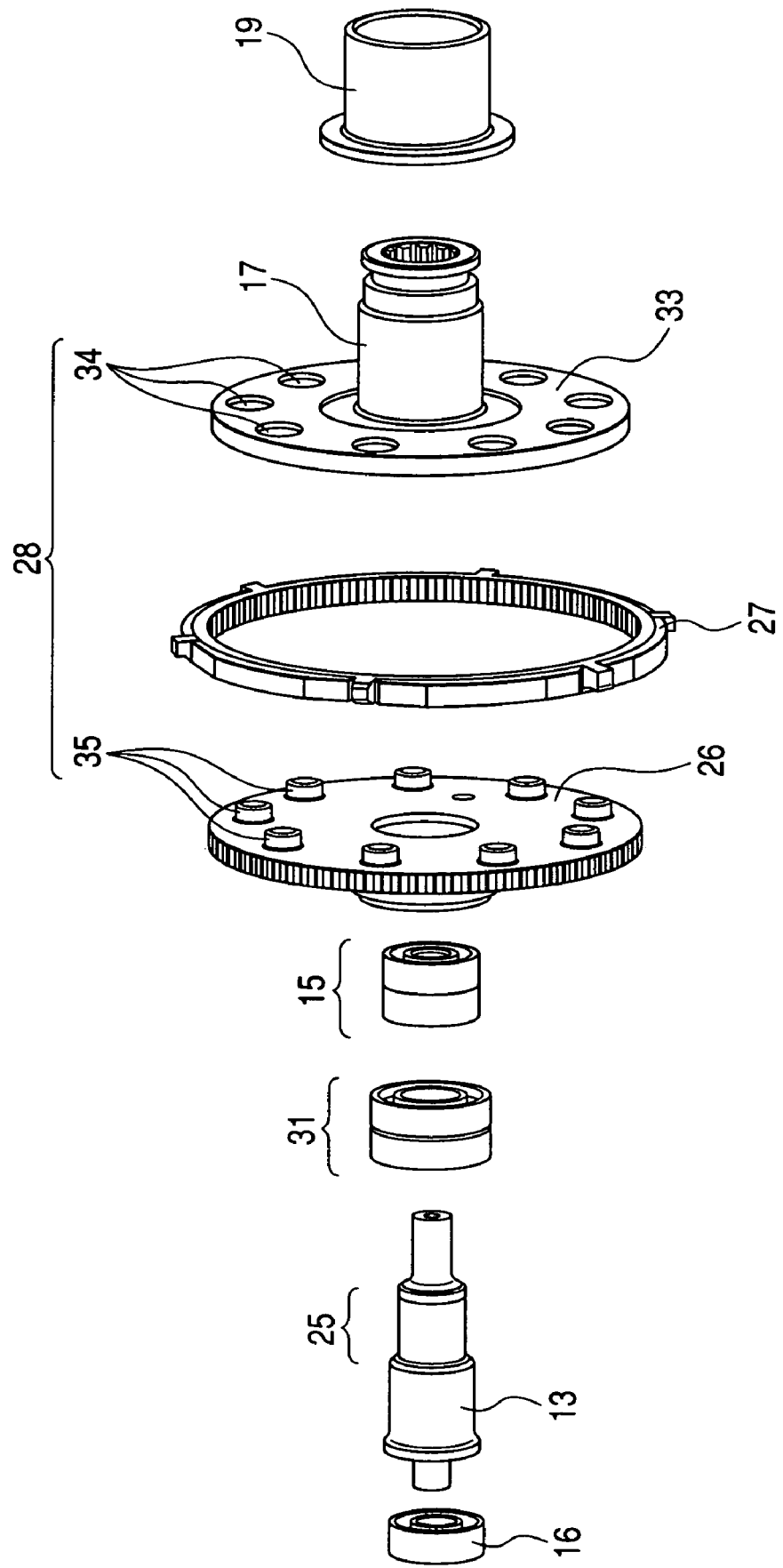
FIG. 7 is an exploded perspective view showing the reduction gear unit in accordance with the preferred embodiment of the present invention.

As shown in FIG. 4, the stator 12 consists of a stator core 21 and a plurality of phase coils 22U, 22U', 22V, 22V', 22W, and 22W'. The stator core 21 has a multilayered body consisting of numerous thin plates being laminated together. The stator core 21 is fixed to the rear housing 20. As shown in FIG. 4, the stator core 21 includes a plurality of stator teeth 23 (i.e. inward salient poles) provided at the same angular intervals of 30 degrees. The stator teeth 23 face to the rotor core 14 positioned at the radial inner side of the stator core 21. Furthermore, a total of six phase coils 22U, 22U', 22V, 22V', 22W, and 22W' are wounded around respective stator teeth 23, so that respective stator teeth 23 can generate magnetomotive forces. Among these plural phase coils, two phase coils 22U and 22U' cooperatively arrange the U-phase winding, two phase coils 22V and 22V' cooperatively arrange the V-phase winding, and two phase coils 22W and 22W' cooperatively arrange the W-phase winding. The U-phase coils 22U and 22U' have mutually opposed magnetic poles, the V-phase coils 22V and 22V' have mutually opposed magnetic poles, and the W-phase coils 22W and 22W' have mutually opposed magnetic poles.

The rotor core 14 has a multilayered body consisting of numerous thin plates being laminated together. The rotor core 14 is press-fitted around the rotor shaft 13. As shown in FIG. 4, the rotor core 14 includes a plurality of rotor teeth 24 (i.e. outward salient poles) provided regularly at the same angular intervals of 45 degrees. The rotor teeth 24 protrude toward the stator core 21 positioned at the radial outer side of the rotor core 14. According to this arrangement, a combination of the stator teeth 23 capably of magnetically attracting the rotor teeth 24 successively changes in accordance with sequential change of electric power supply to respective phase coils. More specifically, from the condition shown in FIG. 4, the rotor 11 can rotate in the clockwise direction when electric power is sequentially supplied in the order of U-phase coils→W-phase coils→V-phase coils. On the other hand, the rotor 11 can rotate in the counterclockwise direction when electric power is sequentially supplied in the order of W-phase coils→U-phase coils→V-phase coils. The rotor 11 rotates by an angle of 45 degrees during one complete period of electric power supply to the U-, V-, and W-phase coils.

Reduction Gear Unit 6

Next, the reduction gear unit 6 will be explained with reference to FIGS. 1 and 5 to 7. The reduction gear unit 6 of this embodiment is an inner gearing planetary reduction gear unit (i.e. a cycloid reduction gear unit). The reduction gear unit 6 includes a sun gear 26 (i.e. an inner gear having an external gear arrangement) causing eccentric rotations about the rotor shaft 13, a ring gear 27 (i.e. an outer gear having an internal gear arrangement) meshing with the sun gear 26, and a transmitting mechanism 28 exclusively transmitting the rotation of the sun gear 26 to the output shaft 17. The sun gear 26 is supported around an eccentric portion 25 provided on the rotor shaft 13 to cause eccentric rotations about the rotor shaft 13.

The eccentric portion 25 is a shaft portion eccentrically rotating about the rotation center of the rotor shaft 13 to cause the sun gear 26 to swing and rotate. The sun gear 26 is rotatably supported by a sun gear bearing 31 disposed on an outer cylindrical surface of the eccentric portion 25. As described above, the sun gear 26 is rotatably supported via the sun gear bearing 31 around the eccentric portion 25 of the rotor shaft 13. Thus, the sun gear 26 rotates in accordance with rotation of the eccentric portion 25 under the restriction of the ring gear 27. The ring gear 27 is fixed to the front housing 18.

The transmitting mechanism 28 consists of plural pin holes 34 provided on a flange 33 and plural internal pins 35 formed on the sun gear 26. The flange 33 integrally rotates with the output shaft 17. The pin holes 34 and the internal pins 35 are arranged at equal angular intervals on the same circle. The internal pins 35 are loosely coupled into the corresponding pin holes 34. Respective internal pins 35 protrude from a front surface of the sun gear 26. Respective pin holes 34 are provided on the flange 33. The flange 33 is provided at the rear end of the output shaft 17. The rotational motion of the sun gear 26 is transmitted to the output shaft 17 via a coupling or engagement of the internal pins 35 and the pin holes 34. With this arrangement, the sun gear 26 rotates eccentrically in response to the rotation of the rotor shaft 13. In other words, the sun gear 26 rotates at a reduced speed compared with the rotor shaft 13. The output shaft 17 rotates together with the sun gear 26 at the reduced speed. The output shaft 17 is connected to a later-described control rod 45 of the shift-range switching mechanism 3. It is however possible, as a modified embodiment, to form the plural pin holes 34 on the sun gear 26 and provide the plural internal pins 35 on the flange 33.

Shift-Range Switching Mechanism 3

Next, the shift-range switching mechanism 3 will be explained with reference to FIG. 3. The shift-range switching mechanism 3 (including the parking lock/unlock mechanism 4) is switched and actuated with the output shaft 17 of the above-described reduction gear unit 6. In general, switching of respective shift ranges (e.g. P, R, N, and D) of an automotive automatic transmission 2 can be accomplished by shifting a manual spool valve 42 to an appropriate position. The manual spool valve 42 is provided in a hydraulic control box 41.

On the other hand, switching of lock and unlock in the parking lock/unlock mechanism 4 can be realized by engaging or disengaging a projection 44a of a park pole 44 with or from a recess 43a of the park gear 43. The park gear 43 is connected to an output shaft (not shown) of the automatic transmission 2 via a differential gear (not shown). The engagement of the park gear 43 and the park pole 44 restricts the rotation of the park gear 43 and locks drive wheels (not shown) of an automotive vehicle. Thus, the parking lock/unlock mechanism 4 establishes the lock condition.

The control rod 45 driven by the reduction gear unit 6 has a detent plate 46 having a sector shape. The detent plate 46 is attached to the control rod 45 by using a spring pin (not shown) or the like. The detent plate 46 has a plurality of recesses 46a provided along a radial outer end thereof (i.e. arc edge of the sector plate). A leaf spring 47 fixed to the hydraulic control box 41 can engage with one of plural recesses 46a, so as to hold the shift range being selected.

A pin 48 attached to the detent plate 46 is for driving the manual spool valve 42. More specifically, the pin 48 engages with a groove 49 provided at a distal end of the manual spool valve 42. When the detent plate 46 rotates about the rotation center of the control rod 45, the manual spool valve 42 engaging with the pin 48 can shift straight in the hydraulic control box 41.

Figure 3:
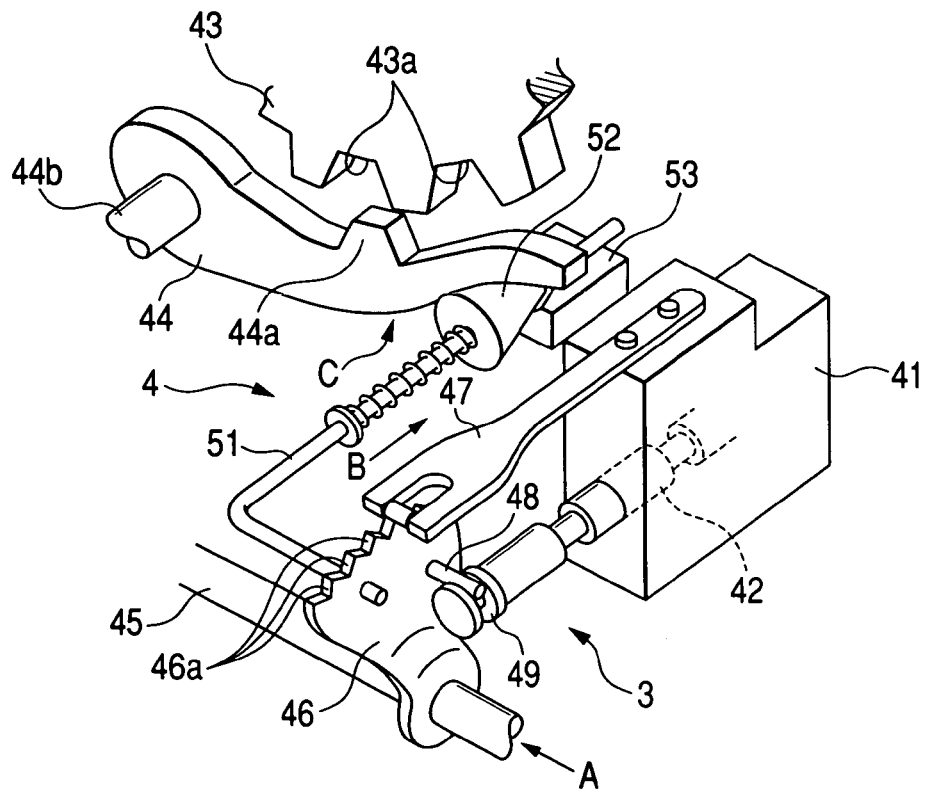
FIG. 3 is a perspective view showing a shift-range switching mechanism including a parking lock/unlock mechanism in accordance with the preferred embodiment of the present invention.

When seen from the direction of arrow 'A' shown in FIG. 3, the clockwise rotation of the control rod 45 is transmitted via the detent plate 46 and the pin 48 to push the manual spool valve 42. The manual spool valve 42 shifts rightward in the hydraulic control box 41. The hydraulic path in the hydraulic control box 41 is switched in order of D→N→R→P in accordance with the shifting position of the manual spool valve 42. In other words, the range of automatic transmission 2 is switched in order of D→N→R→P. Furthermore, the counterclockwise rotation of the control rod 45 is transmitted via the detent plate 46 and the pin 48 to pull the manual spool valve 42. In this case, the manual spool valve 42 shifts leftward in the hydraulic control box 41. The hydraulic path in the hydraulic control box 41 is switched in order of P→R→N→D in accordance with the shifting position of the manual spool valve 42. In other words, the range of automatic transmission 2 is switched in order of P→R→N→D.

Furthermore, a park rod 51 attached to the detent plate 46 is for driving the park pole 44. The park rod 51 has a conical head 52 provided at its distal end. The conical head 52 is placed between the park pole 44 and a protruded portion 53 of the housing of the automatic transmission 2. When seen from the direction of arrow 'A' shown in FIG. 3, the clockwise rotation of the control rod 45 (for realizing the R→P range change) is transmitted via the detent plate 46 to shift the park rod 51 in the direction of arrow 'B' shown in FIG. 3. The conical head 52 pushes the park pole 44 upward. The park pole 44 rotates about the center of the shaft 44b in the direction of arrow 'C' shown in FIG. 3. The projection 44a of the park pole 44 engages with the recess 43a of the park gear 43. Thus, the parking lock/unlock mechanism 4 establishes the lock condition.

Furthermore, the counterclockwise rotation of the control rod 45 (for realizing the P→R range change) is transmitted via the detent plate 46 to shift the park rod 51 in the direction opposed to the arrow 'B' in FIG. 3. The park pole 44 is lowered. The park pole 44 is resiliently pressed by a torsion coil spring (not shown) in the direction opposed to the arrow C shown in FIG. 3. The projection 44a of the park pole 44 disengages from the recess 43a of the park gear 43. The park gear 43 can rotate freely. Thus, the parking lock/unlock mechanism 4 establishes the unlock condition.

Encoder 60

Next, the encoder 60 will be explained with reference to FIGS. 1 and 8 to 13. The above-described rotary actuator 1 has an encoder 60 mounted on the housing (consisting of the front housing 18 and the rear housing 20). The encoder 60 has the capability of detecting a rotational angle of the rotor 11. The encoder 60 detecting the rotational angle of the rotor 11 enables the motor 5 to realize high-speed operations without causing any step out.

The encoder 60 is an incremental type including a magnet 61 integrally rotating with the rotor 11, magnetic detecting Hall ICs 62 disposed in the rear housing 20 (consisting of first and second rotational angle detecting Hall ICs 62A and 62B and a single index Hall IC 62Z), and a substrate 63 supporting these Hall ICs 62 in the rear housing 20.

The magnet 61, having a ring disk shape as shown in FIGS. 8 to 11, is disposed coaxially with the rotor shaft 13. The magnet 61 is connected to an end surface (i.e. rear surface) of the rotor core 14 in the axial direction. If there is the possibility that the rotor core 14 may give adverse magnetic effect to the magnet 61, it will be preferable to dispose a non-magnetic membrane member (not shown) between the magnet 61 and the rotor core 14 to weaken or lessen the influence of the magnetic force. Otherwise (i.e. when the magnetic effect given from the rotor core 14 to the magnet 61 is small), the magnet 61 can be directly connected to the rotor core 14. This will bring the effects of reducing the total number of parts and accordingly reducing the manufacturing costs.

The magnet 61 is a magnetized magnetic member. As one practical example, the magnet 61 is a neodium magnet (one example of rare-earth magnets) having a predetermined thickness in the axial direction. The magnet 61, generating a magnetic force, can magnetically join with the rotor core 14. As one practical example, the magnet 61 has a contact surface being magnetized and connected with the rotor core 14 with a magnetic force generated from the magnetized contact surface. Alternatively, it is possible to use an appropriate adhesive to bond the magnet 61 with the rotor core 14.

Figure 10:
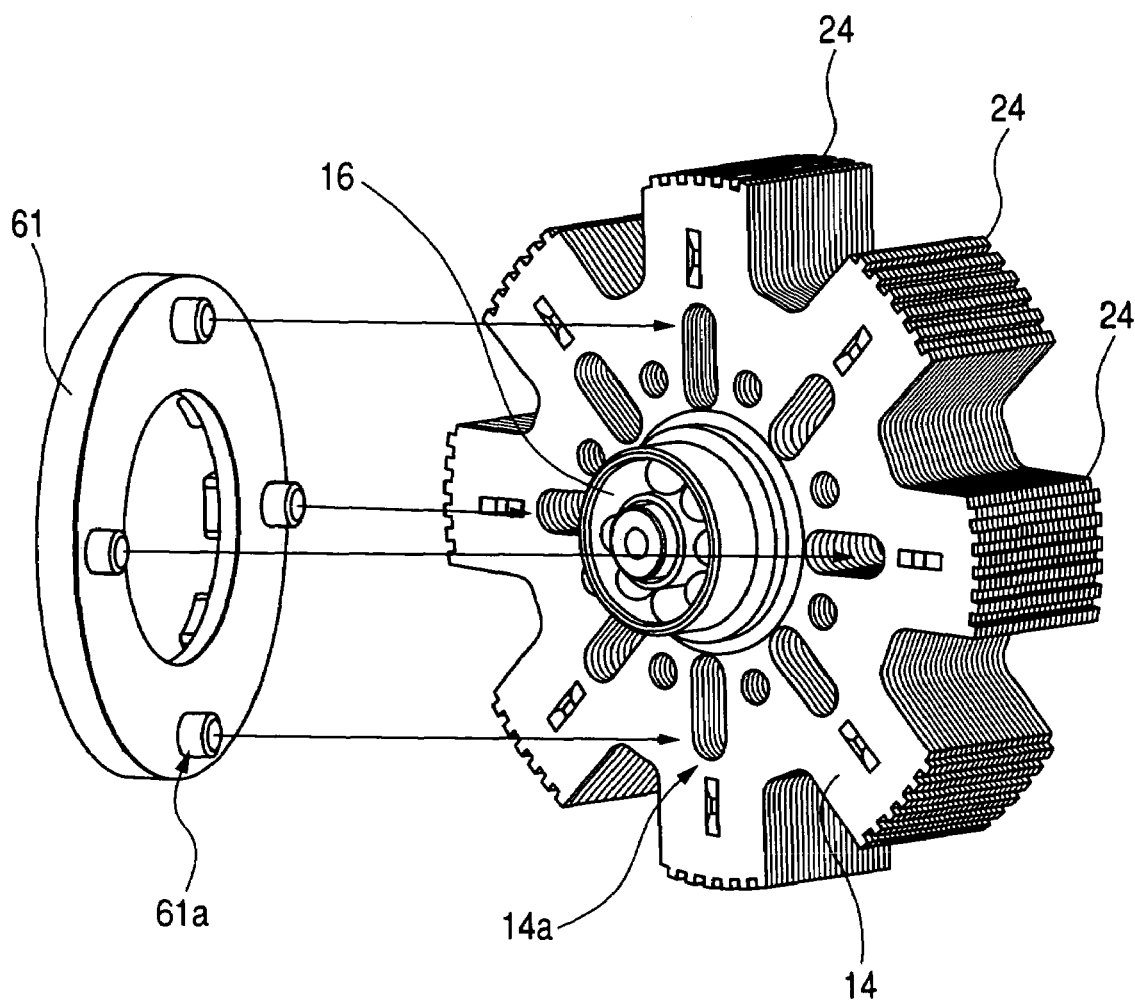
FIG. 10 is a perspective view explaining the assembling of the magnet and a rotor core in accordance with the preferred embodiment of the present invention.

As shown in FIG. 10, the rotor core 14 has a plurality of magnet positioning holes 14a provided on its rear surface. On the other hand, the magnet 61 has a plurality of projections 61a provided on its contact surface to be jointed with the rotor core 14. The magnet 61 can be coaxially assembled with the rotor core 14 by inserting the projections 61a of the magnet 61 into the holes 14a of the rotor core 14.

Figure 8B:
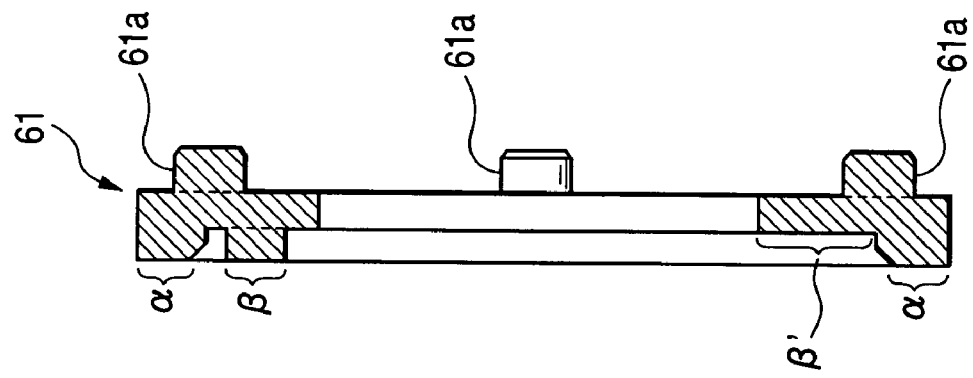
FIGS. 8A and 8B are plan and cross-sectional views showing magnetization of a magnet in accordance with the preferred embodiment of the present invention.
Figure 8A:
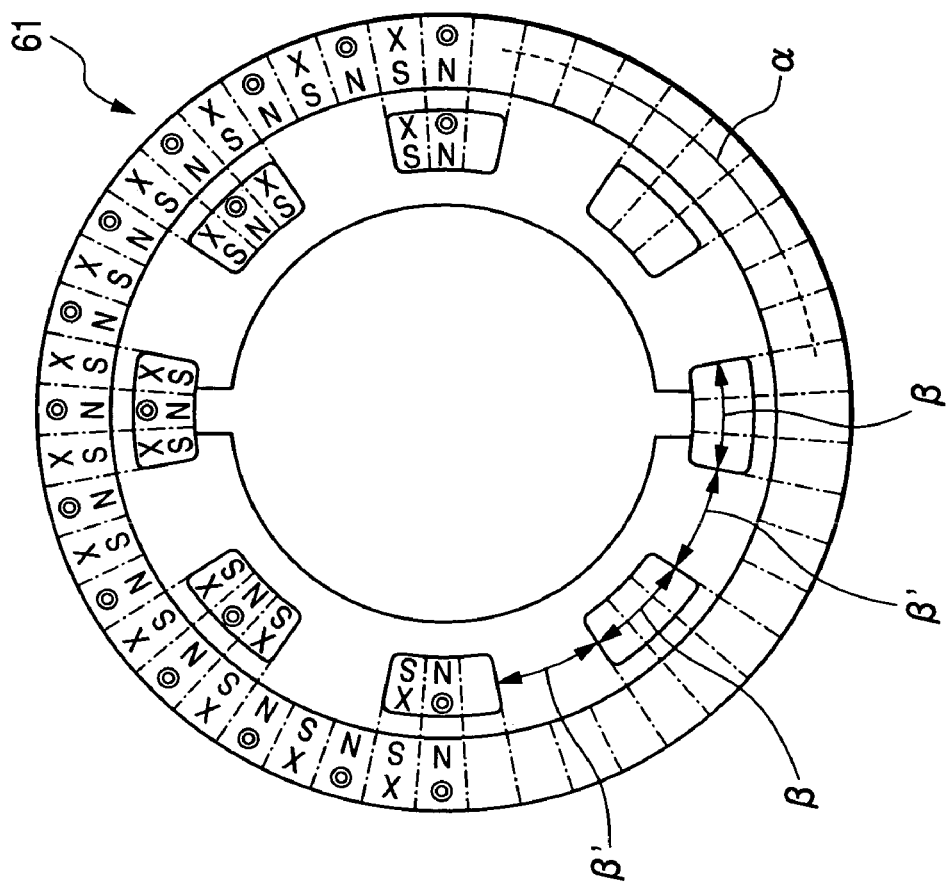
Figure 9:
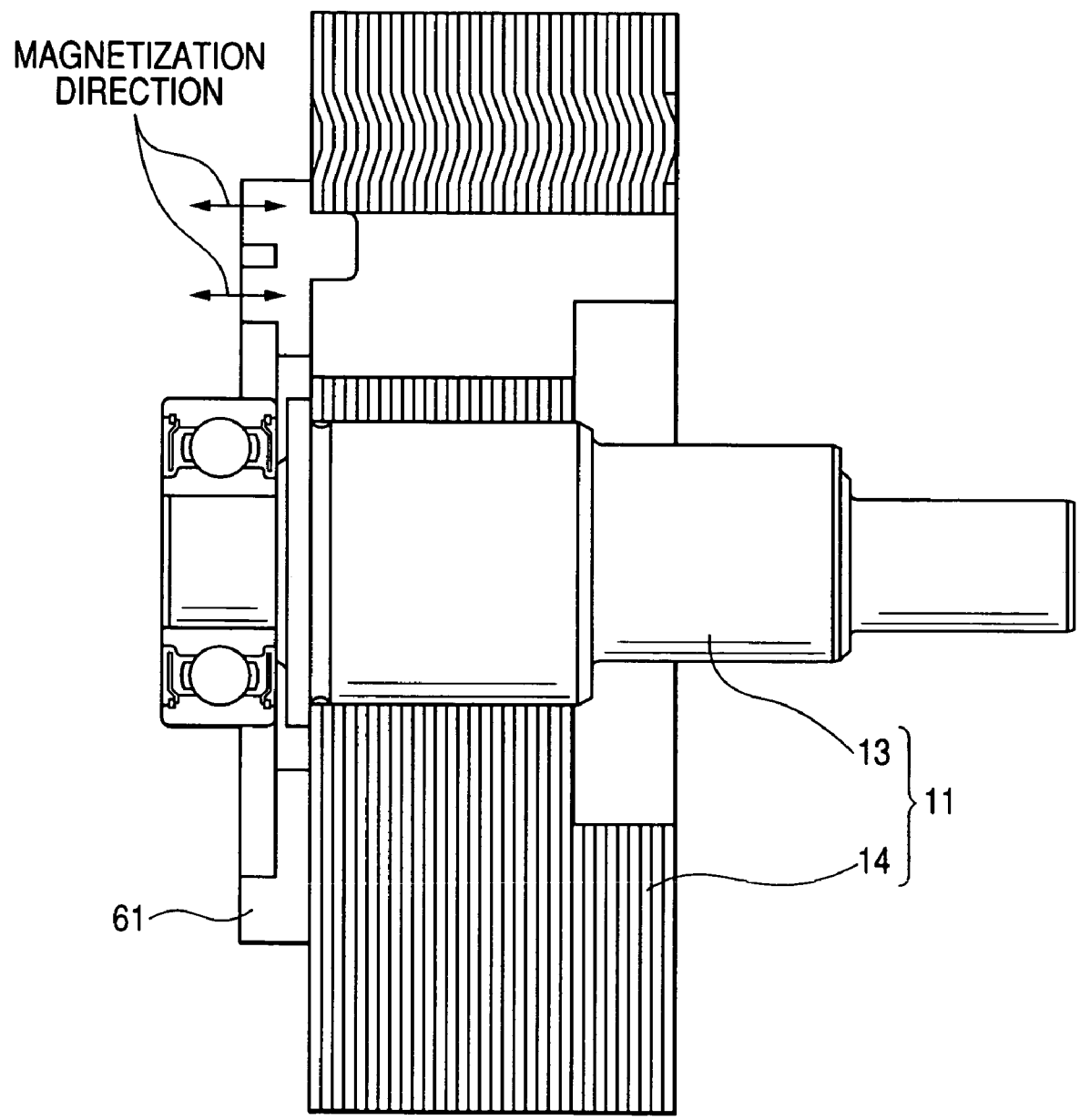
FIG. 9 is a cross-sectional view showing a rotor assembled with the magnet in accordance with the preferred embodiment of the present invention.

The magnet 61 of this embodiment is connected to the rotor core 14, and then magnetization for detecting rotational angle and index is applied on a surface opposing to the Hall ICs 62 (i.e. rear surface). Thus, the magnet 61 can generate magnetic forces in the axial direction as shown in FIG. 9. Hereinafter, the magnetization applied on the surface opposing to the Hall ICs 62 (i.e. rear surface) will be explained in detail. As shown in FIGS. 8A and 8B, the magnet 61 has a rotational angle magnetizing section $\alpha$ provided along the outer periphery on its rear surface. The rotational angle magnetizing section $\alpha$ is applied multipolar magnetization extending in the rotational direction for generating/stopping the rotational angle signal. Furthermore, the magnet 61 has index magnetizing sections $\beta$ and index non-magnetizing sections $\beta'$ alternately extending in the rotational direction and positioned at the radial inner side of the rotational angle magnetizing section $\alpha$. Each index magnetizing sections $\beta$ is magnetized for generating/stopping the index signal. Each index non-magnetizing sections $\beta'$ is not relevant to generation of the index signal. It is possible to apply the above-described rotational angle and index detecting magnetization on the surface opposing to the Hall ICs 62 of the magnet 61 (i.e. rear surface) before the magnet 61 is connected to the rotor core 14.

Figure 11:
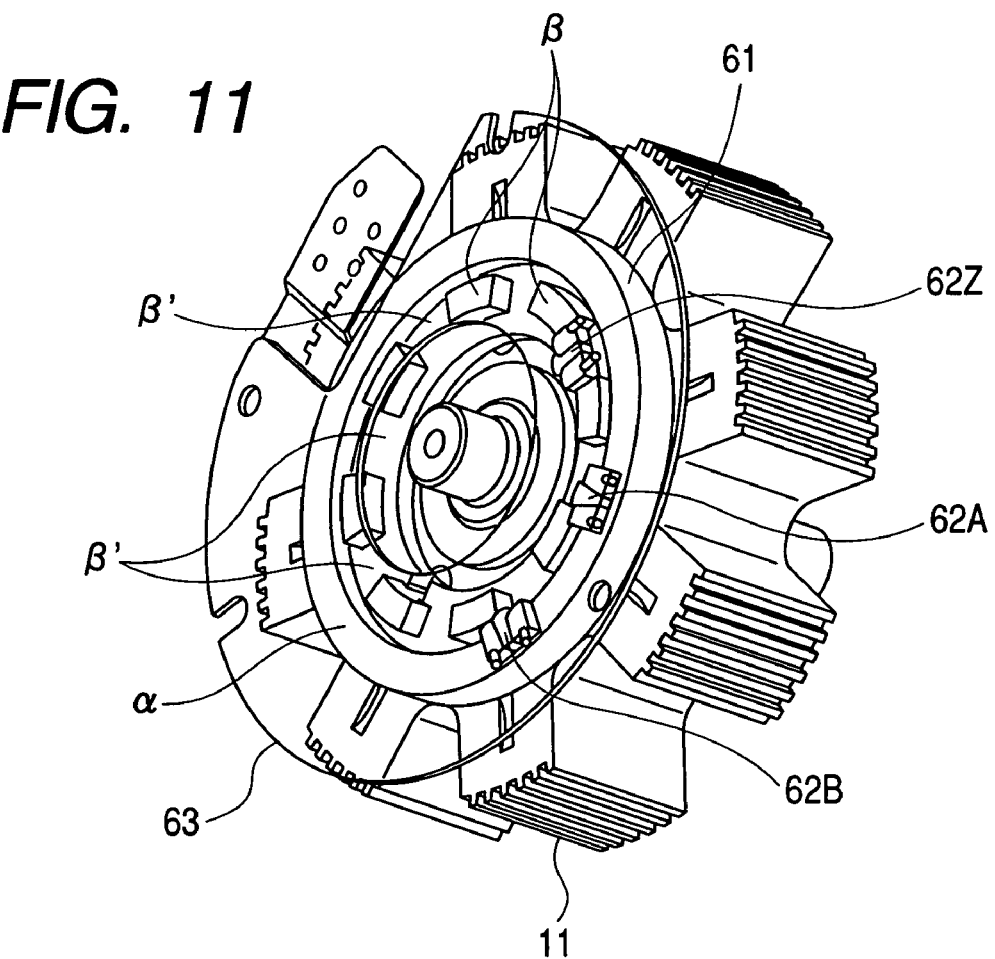
FIG. 11 is a perspective view showing an encoder in accordance with the preferred embodiment of the present invention.

According to the magnet 61 of this embodiment, as shown in FIG. 11, the index non-magnetizing sections β' are provided as recessed portions so as to have large gaps against the index Hall IC 62Z. The index non-magnetizing sections β' are recessed forward relative to the index Hall IC 62Z. In other words, both the rotational angle magnetizing section α and the index magnetizing sections β are provided as protruded islands. Only the protruded surfaces of these islands are magnetized. The index non-magnetizing sections β' being not magnetized are thus recessed to provide large gaps between the index non-magnetizing sections β'and the index Hall IC 62Z.

The multipolar magnetization applied to the rotational angle magnetizing section α is for generating the rotational angle signal (hereinafter, referred to as A-phase signal or B-phase signal), as shown in FIG. 8A. According to this embodiment, N-poles and S-poles are alternately magnetized at the regular pitches of 7.5 degrees. The rotational angle magnetizing section α has a total of 48 polar sections (A- and B-phase sensing sections). The index magnetizing sections β are for generating the index signal (hereinafter, referred to as Z-phase signal) at the cycle (at the intervals of 45 degrees) corresponding to one complete cycle of electric power supply to each phase (U-, V-, W-phase) coil 22. Each index magnetizing section β includes a Z-phase signal generating N-pole and two S-poles positioned at both ends of this N-pole. The Z-phase signal generating N-poles are magnetized at the regular pitches of 45 degrees. According to this embodiment, N-poles and S-poles of the index magnetizing sections β are angularly agreeable with the N-poles and S-poles of the rotational angle magnetizing section α. It is however possible to arrange the N-poles and S-poles of the index magnetizing sections β so as to disagree with the N-poles and S-poles of the rotational angle magnetizing section α. Furthermore, this embodiment shows the Z-phase signal generating S-poles magnetized at the pitches of 7.5 degrees. However, it is possible to set the pitches of the Z-phase signal generating S-poles so as to partly overlap with the pitches of the rotational angle magnetizing section α. Each index non-magnetizing section β' is positioned between one index magnetizing section β and a neighboring index magnetizing section β (i.e. the gap in the rotational direction), as a portion generating no Z-phase signal. Accordingly, the index non-magnetizing sections β' are not magnetized.

The substrate 63, as shown in FIG. 11, is a member for supporting the first and second rotational angle detecting Hall ICs 62A and 62B so as to face to the rotational angle magnetizing section α and also supporting the index Hall IC 62Z so as to face to the index magnetizing sections β and the index non-magnetizing sections β'. The first and second rotational angle detecting Hall ICs 62A and 62B are angularly offset by an angle of 3.75 degrees (i.e. 90 degrees in terms of electric angle). As a result, the A-phase signal and the B-phase signal are produced to have a relative phase difference of 3.75 degrees (i.e. 90 degrees in terms of electric angle) as understood from FIG. 13.

Figure 12:
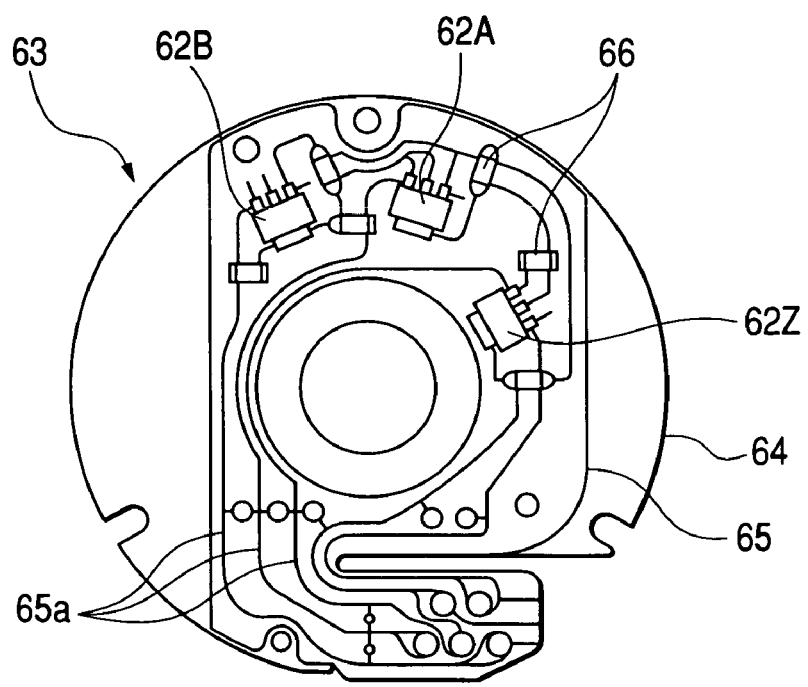
FIG. 12 is a plan view showing a substrate in accordance with the preferred embodiment of the present invention.

The substrate 63 is supported by an inner wall of the rear housing 20. As shown in FIG. 12, the substrate 63 consists of a non-magnetic metallic plate 64 (e.g. aluminum, or stainless) and a film substrate 65 coated on the surface of this metallic plate 64. The film substrate 65 is made of an insulating resin material (e.g. polyimide). It is possible to form the substrate 63 by using a glass-fiber reinforced epoxy substrate. The film substrate 65 has a plurality of circuit patterns 65a printed on the surface isolated from the metallic plate 64. In addition to the Hall ICs 62 (62A, 62B, and 62Z), noise filtering capacitors 66 and the like are mounted on the substrate 63. Respective electronic components are electrically connected to the circuit patterns 65a. On the other hand, the circuit patterns 65a have end portions electrically connected to terminals (not shown) provided in the rear housing 20. The terminals are connected to external connectors.

Each of the first and second rotational angle detecting Hall ICs 62A and 62B and the index Hall IC 62Z is arranged as an integrated circuit consisting of a hall element and an ON/OFF signal generating circuit. The hall element generates an output corresponding to a magnetic flux having passed. When the magnetic flux density of N-poles given to the hall element exceeds a predetermined threshold (e.g. being set in the range from 0.9 to 5 mT), the Hall ICs generate rotational angle signals (A-phase signal, B-phase signal, and Z-phase signal) of ON state. When the magnetic flux density of S-poles exceeds a predetermined threshold (e.g. being set in the range from −0.9 to −5 mT), the Hall ICs generate rotational angle signals (A-phase signal, B-phase signal, and Z-phase signal) of OFF state. Although this embodiment arranges each Hall IC by integrating a hall element and an ON-OFF signal generating circuit, it is possible to separately or independently dispose the hall element and the ON-OFF signal generating circuit. More specifically, it is possible to mount the ON-OFF signal generating circuit separately from the hall element on the substrate 63 or incorporate the ON-OFF signal generating circuit into the control circuit (such as ECU 70). Furthermore, this embodiment discloses an example using a magnetic detecting encoder 60 having Hall ICs 62. However, it is possible to use an encoder having pickup coils or an optical encoder.

Figure 13:
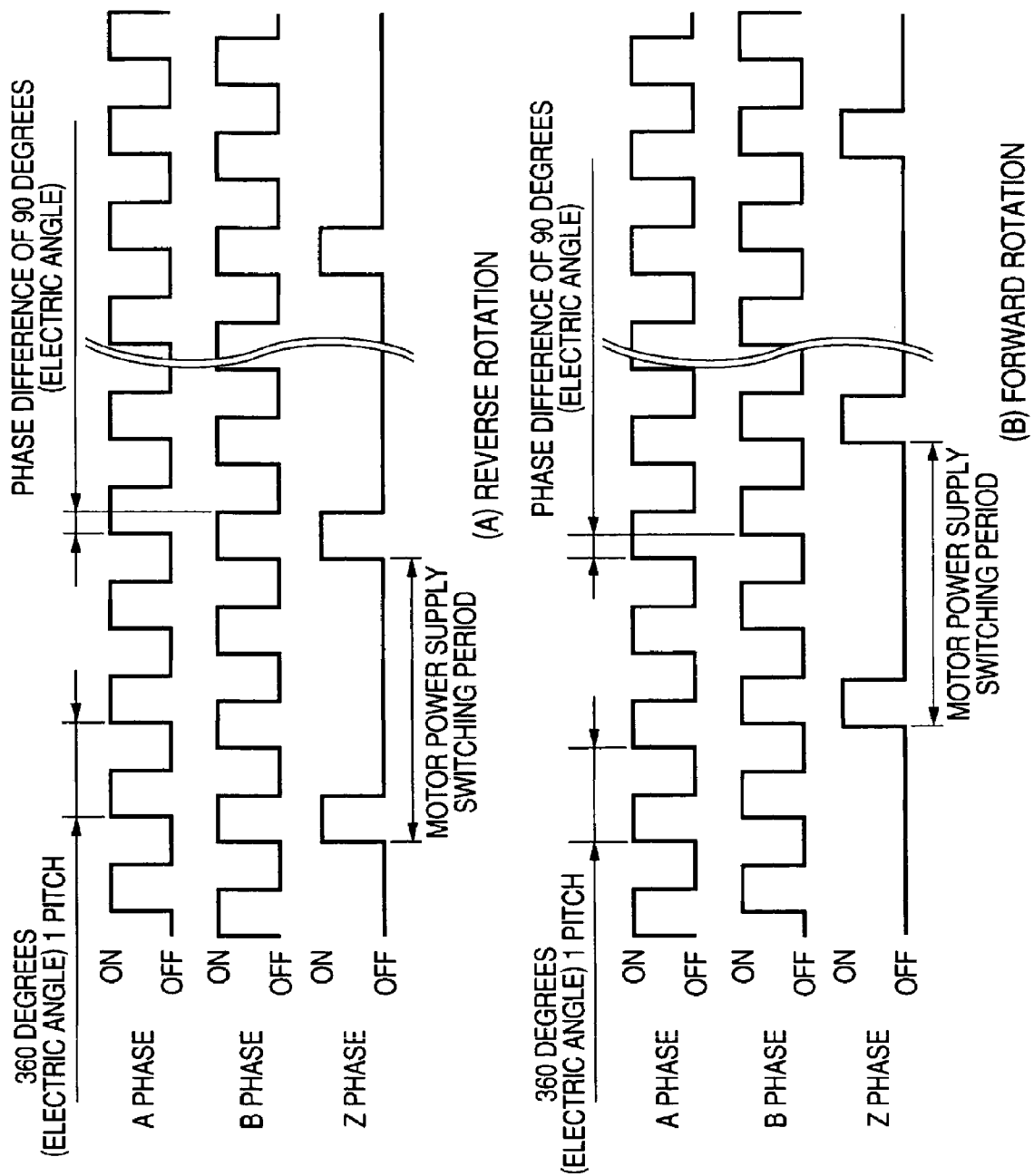
FIG. 13 is a diagram showing output waveforms of A-, B-, and Z-phase signals produced in response to rotation of the rotor in accordance with the preferred embodiment of the present invention.

FIG. 13 shows the output waveforms of the A-phase signal, B-phase signal, and the Z-phase signal produced from the encoder 60. The A-phase signal and the B-phase signal are output signals having a relative phase difference of 3.75 degrees (i.e. 90 degrees in terms of electric angle). According to this embodiment, each of the A-phase signal and the B-phase signal produces an output of one cycle during 15-degree rotation of the rotor 11. The Z-phase signal produces an output every time the rotor 11 rotates 45 degrees. The Z-phase signal is an index signal (ON signal according to this embodiment) for switching electric power supply to the motor. The Z-phase signal defines the electric power supply phase of the motor 5 in relation to the A-phase and B-phase signals.

As explained above, according to the above-described embodiment, the encoder 60 is incorporated in the rotary actuator 1. Thus, it becomes possible to downsize the rotary actuator 1 mounting the encoder 60. Furthermore, according to this embodiment, the magnet 61 and the Hall ICs 62 are disposed behind the rotor core 14. Accordingly, it becomes possible to reduce or suppress the radial size of the rotary actuator 1 mounting the encoder 60. This will improve installability of the rotary actuator 1 when it is assembled into an automotive vehicle,

ECU 70

Next, ECU 70 will be explained with reference to FIG. 2. ECU 70 controls the rotation of motor 5 based on the shift position of a range shifting device (not shown) manually operated by an occupant and also based on the rotational angle of the rotor 11 detected by the encoder 60. Furthermore, ECU 70 controls the switching of the shift-range switching mechanism 3 which is driven via the reduction gear unit 6.

Figure 2:
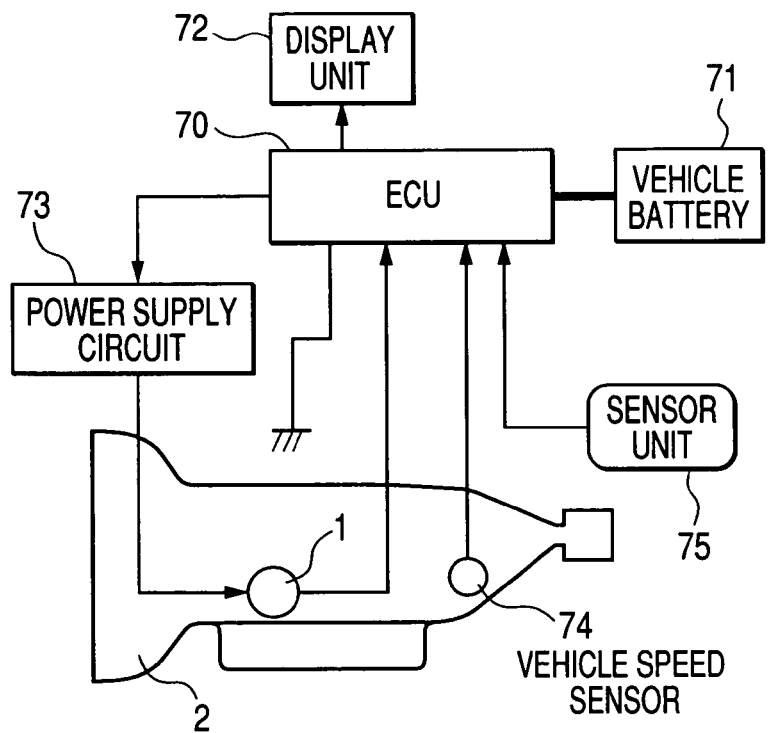
FIG. 2 is a schematic diagram showing a system arrangement of a shift-range switching apparatus in accordance with the preferred embodiment of the present invention.
Figure 14:
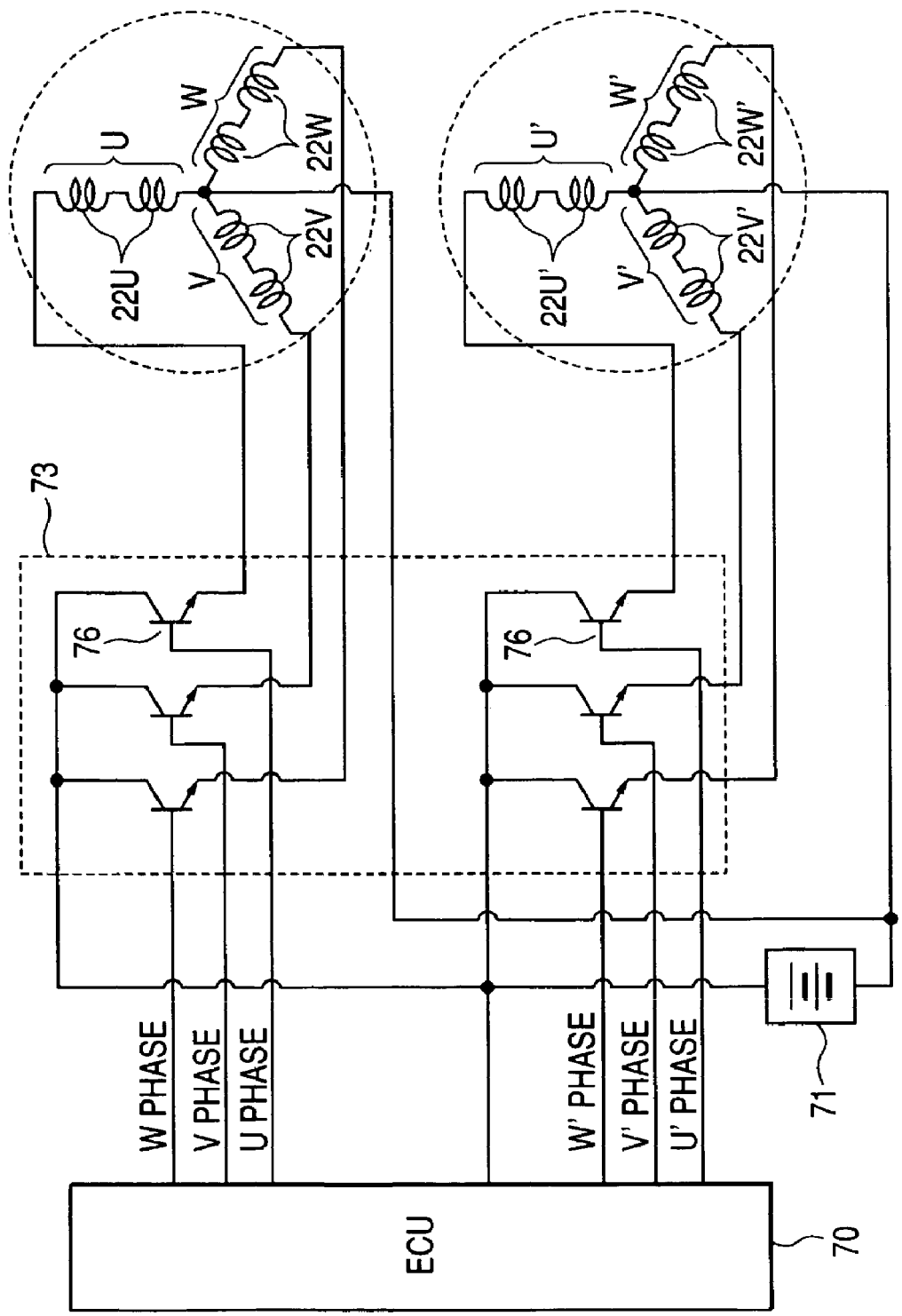
FIG. 14 is a diagram showing an electric power supply circuit for a motor in accordance with the preferred embodiment of the present invention.

As shown in FIG. 2, ECU 70 is connected to a vehicle battery 71, a display unit 72 (e.g. visual display, alarm, and buzzer) indicating the shift range and the condition of the rotary actuator 1, a power supply circuit 73 of the motor 5, a vehicle speed sensor 74, and a sensor unit 75 including a range position detecting sensor, a brake switch, and vehicle condition detecting sensors. FIG. 14 is a circuit diagram showing the power supply circuit 73 of the motor 5. According to this embodiment, the phase coils 22U, 22V, 22W and the phase coils 22U', 22V', 22W' are connected to form the star-arrangement, respectively. Electric power is supplied via a switching element 76 to each of the phase coils having different polarities. ECU 70 controls the on/off state of each switching element 76.

Characteristics of the Preferred Embodiment

It is desirable to increase the output torque of the rotary actuator 1 without increasing cost and size. The radial inner portion of the rotor core 14, where the rotor core 14 and the rotor shaft 13 are connected, has an electromagnetically excessive capacity. As far as a sufficient connecting force is assured between the rotor core 14 and the rotor shaft 13, it is possible to partly remove an excessive portion of the electromagnetically excessive capacity at the radial inner portion of the rotor core 14. According to this embodiment, a recess 77 is provided at the radial inner portion of the rotor core 14. The recess 77 is a cylindrical bore retracting in the axial direction from the front surface of the rotor core 14, facing to the reduction gear unit 6, toward the rear surface of the rotor core 14. The recess 77 provides a space for accommodating a rear part of a supporting portion for supporting the sun gear 26. According to this embodiment, the sun gear bearing 31 is disposed in the recess 77. The region (amount) of the recess 77, i.e. the radial inner side of the rotor core 14 to be removed, should be determined to be equal to or less than the excessive portion of the electromagnetic capacity. Furthermore, the region (amount) of the recess 77 should be determined so that a satisfactory connecting force is assured between the rotor core 14 and the rotor shaft 13.

As described above, the rotor core 14 includes numerous thin plates being laminated together. The rotor core 14 according to this embodiment includes two kinds of laminated thin plates; i.e. the first group consisting of laminated thin plates having an inner radial size into which the rotor shaft 13 is press-fitted, and the second group consisting of laminated thin plates having a larger inner radial size defining the recess 77. The inner radial size of the second group consisting of laminated thin plates defining the recess 77 is larger than a sum of an outer radial size of the portion supporting the sun gear bearing 31 of the sun gear 26 and two times the eccentric amount of the eccentric portion 25 of the rotor shaft 13. According to the conventional arrangement, the single-bearing arrangement is employed to support the sun gear bearing 31 from the requirement to shorten the opposing distance between the rotor core 14 and the sun gear 26 in the axial direction. On the other hand, this embodiment provides the recess 77 at the radial inner side of the rotor core 14 so as to open toward the reduction gear unit 6. Providing the recess 77 at the radial inner side of the rotor core 14 enables the sun gear bearing 31 to axially extend toward the rotor core 14 without increasing the opposing distance between the rotor core 14 and the sun gear 26. Thus, the sun gear bearing 31 can be enlarged in its axial size so as to extend from the radial inner portion of the sun gear 26 into the recess 77 in the axial direction. According to this embodiment, to increase the axial size of the sun gear bearing 31 without increasing the radial size of the sun gear bearing 31, the roller members (i.e. balls according to this embodiment) are disposed adjacently and parallel to each other in the axial direction to form the double-bearing arrangement. According to this embodiment, the rear side of this double-bearing arrangement is partly disposed in the recess 77.

Providing the recess 77 at the radial inner portion of the rotor core 14 brings the effects of enlarging the axial size of the supporting portion (i.e. sun gear bearing 31) of the sun gear 26 and accordingly preventing the sun gear 26 from inclining or tilting. In general, if a large load is applied on the sun gear 26, the sun gear 26 will incline or tilt and accordingly the meshing accuracy between the sun gear 26 and the ring gear 27 will deteriorate. The torque transmission efficiency in the reduction gear unit 6 (i.e. inner gearing planetary reduction gear unit) will deteriorate and accordingly the output torque of the rotary actuator 1 will deteriorate. In this respect, as described above, the rotary actuator 1 according to this embodiment can provide a sufficiently long supporting portion of the sun gear 26 (i.e. sun gear bearing 31) axially extending into the recess 77 formed at the radial inner portion of the rotor core 14. Hence, even if the sun gear 26 is subjected to a large load, the sun gear 26 does not incline or tilt. Thus, the reduction gear unit 6 has excellent torque transmission efficiency. The rotary actuator 1 can generate a large output torque. In short, the preferred embodiment of the present invention can provide a rotary actuator capable of increasing a large output torque without increasing the overall size thereof.

Meanwhile, in the case of improving the output torque of the rotary actuator 1, a large load will be applied to the bearing located in the rotary actuator 1. It is thus necessary to increase the bearing load capacity of this bearing. Especially, due to restrictions to suppress the axial size of the rotary actuator, the sun gear bearing cannot be enlarged outwardly and accordingly it was conventionally difficult to increase the bearing load capacity of the sun gear bearing. However, according to the rotary actuator 1 of the preferred embodiment, the supporting portion of the sun gear 26 (i.e. sun gear bearing 31) can be extended into the recess 77 of the rotor core 14 as described above. Accordingly, the preferred embodiment can provide a rotary actuator capable of increasing the bearing load capacity of the sun gear bearing 31 without increasing the overall size of the rotary actuator 1.

Furthermore, providing the recess 77 as an axially extending bore in the rotor core 14 for accommodating the axially elongated supporting portion of the sun gear 26 (i.e. sun gear bearing 31) ensures the above-described effects (i.e. obtaining a large output without increasing the overall size of the rotary actuator). Namely, the rotary actuator 1 of this embodiment brings the above-described effects without increasing the cost of the core (i.e. the rotor core 14 and the stator core 21) of the motor 5. Furthermore, the region (or portion) to be removed from the rotor core 14 is limited within an excessive portion of the electromagnetic capacity. Thus, no adverse effects will be given to the characteristics of the motor 5. The output characteristics will not deteriorate, and electric power consumption will not increase. Furthermore, the reduction gear unit 6 can provide a required reduction gear ratio and accordingly the response of the rotary actuator 1 does not deteriorate. Furthermore, the overall size of the rotary actuator 1 does not increase. Furthermore, providing the recess 77 at the radial inner portion of the rotor core 14 is effective in reducing the weight of the rotor core 14.

Modified Embodiments

Although the above-described preferred embodiment discloses the switched-reluctance motor as one example of the motor 5, it is possible to use a synchronous reluctance motor or other reluctance motor. Although the above-described preferred embodiment discloses the brushless motor as one example of the motor 5, it is possible to use a brush motor which includes rotor coils provided at the rotor and electric power is supplied to these rotor coils. Although the above-described preferred embodiment discloses the electric motor using no permanent magnets as one example of the motor 5, it is possible to use an electric motor mounting permanent magnets.

Although the above-described preferred embodiment discloses the inner gearing planetary reduction gear unit (i.e. cycloid reduction gear unit) as one example of the reduction gear unit 6, it is possible to use a planetary reduction gear unit including a sun gear driven by a rotor shaft, a plurality of planetary pinions disposed around this sun gear at equal intervals, and a ring gear meshing with these planetary pinions. In this case, the sun gear can be supported by the rotor shaft via a long supporting portion extending in the axial direction. Thus, this modified arrangement can bring the effects substantially similar to those of the preferred embodiment. Although the above-described preferred embodiment discloses the inner gearing planetary reduction gear unit (i.e. cycloid reduction gear unit) as one example of the reduction gear unit 6, it is possible to use a combined unit of reduction gear trains including a sun gear driven by a rotor shaft and a plurality of gear trains meshing with this sun gear. In this case, a long supporting portion can be provided for supporting the sun gear. Thus, this modified arrangement can bring the effects substantially similar to those of the preferred embodiment.

Although the above-described preferred embodiment discloses the rotary actuator generating a rotation torque for operating the shift-range switching apparatus mounted on the automatic transmission 2, it is possible to apply the present invention to a rotary actuator adjusting the advanced angle of a cam shaft or any other rotary actuator, which includes a combination of a motor and a reduction gear unit.

What is claimed is:

1. A rotary actuator comprising:
    a motor having a rotor including a rotor core fixed on a rotor shaft and a stator disposed at a radial outer side of said rotor core; and
    a reduction gear unit reducing a rotational speed of said rotor shaft, including an eccentric portion causing eccentric rotations and a sun gear disposed via a sun gear bearing on an outer cylindrical surface of said eccentric portion of said rotor shaft to cause swing and rotational motion and disposed adjacently to said rotor core in an axial direction of said rotor shaft,
    wherein said sun gear bearing includes roller members disposed adjacently and parallel to each other in the axial direction so as to form a double-bearing arrangement,
    said reduction gear unit is formed as an inner gearing planetary reduction gear unit including said sun gear, a ring gear meshing with said sun gear, and transmitting mechanism transmitting rotation of said sun gear to an output shaft,
    said rotor core is formed to have, at a radially inner portion thereof, an axially extending space opened toward said reduction gear unit, and
    at least one of said roller members of said double-bearing arrangement is partly disposed in said axially extending space.

2. The rotary actuator in accordance with claim 1, wherein said motor is a reluctance motor.

3. The rotary actuator in accordance with claim 1, wherein said rotary actuator is for driving a shift-range switching apparatus of an automotive automatic transmission.

4. The rotary actuator in accordance with claim 1, wherein the reduction gear further has a rear roller bearing press-fitted around an outer cylindrical surface of the rear end of the rotor shaft, the rotary actuator comprising:
    a housing including a front housing having an inner cylindrical surface with a metal bearing supporting the output shaft of the reduction gear, and a rear housing supporting the rear roller bearing, wherein the motor and the reduction gear unit are both accommodated inside the space formed by the front housing and the rear housing.

5. The rotary actuator in accordance with claim 4, wherein said motor is a reluctance motor.

6. The rotary actuator in accordance with claim 4, wherein said rotary actuator is for driving a shift-range apparatus of an automotive automatic transmission.

7. The rotary actuator in accordance with claim 4, further comprising a magnetic detecting encoder for detecting a rotation angle of the rotor of the motor, wherein the magnetic detecting encoder also is mounted inside the space formed by the front housing and the rear housing.

* * * * *